United States Patent [19]

Gustafson

[11] 4,028,227
[45] June 7, 1977

[54] HYDROTREATING OF PETROLEUM RESIDUUM USING SHAPED CATALYST PARTICLES OF SMALL DIAMETER PORES

[75] Inventor: William Roy Gustafson, Trumbull, Conn.

[73] Assignee: American Cyanamid Company, Stamford, Conn.

[22] Filed: Apr. 5, 1976

[21] Appl. No.: 673,839

Related U.S. Application Data

[60] Division of Ser. No. 508,780, Sept. 24, 1974, Pat. No. 3,966,644, which is a continuation-in-part of Ser. No. 385,519, Aug. 3, 1973, abandoned, which is a continuation-in-part of Ser. No. 255,491, May 22, 1972, abandoned.

[52] U.S. Cl. ................................................. 208/216
[51] Int. Cl.² ........................................ C10G 23/02
[58] Field of Search .............. 208/216, 254 H, 111

[56] References Cited

UNITED STATES PATENTS

| | | | |
|---|---|---|---|
| 3,509,044 | 4/1970 | Adams et al. | 208/216 |
| 3,630,888 | 12/1971 | Albert et al. | 208/216 |
| 3,674,680 | 7/1972 | Hoekstra et al. | 208/216 |
| 3,770,617 | 11/1973 | Riley et al. | 208/216 |
| 3,770,618 | 11/1973 | Adams et al. | 208/216 |
| 3,990,964 | 11/1976 | Gustafson | 208/216 |

*Primary Examiner*—George Crasanakis
*Attorney, Agent, or Firm*—William J. van Loo

[57] ABSTRACT

Shaped catalyst particles having a polylobal cross-section are utilized in hydrotreating a petroleum residuum to obtain a desulfurized product. The catalyst particles have a surface area greater than 150 m²/g and a catalyst pore volume of 0.35–0.85 cc/g resulting from a major portion of pores of diameters in the range 40–90A.

7 Claims, 13 Drawing Figures

HYDROTREATING OF PETROLEUM RESIDUUM USING SHAPED CATALYST PARTICLES OF SMALL DIAMETER PORES

This is a division of application Ser. No. 508,780, filed Sept. 24, 1974, now U.S. Pat. No. 3,966,644 which is a continuation-in-part application of Ser. No. 385,519, filed Aug. 3, 1973, now abandoned which, in turn, is a continuation-in-part of Ser. No. 255,491, filed May 22, 1972, and now abandoned.

This invention relates to small porous catalyst particles having specific shape and pore characteristics and advantageous utility in hydrotreating petroleum residuum. More particularly, the invention relates to such particles that have concave cros-sectional shape characteristics and a pore volume constituted of a major portion of small-diameter pores. The invention also relates to a residuum-hydrotreating process employing the catalyst particles.

In the past, catalyst particles were generally of spherical or cylindrical shape. Such shape characteristics were convex in nature and such particles provided desirable activity for the specific hydrotreating processes in which they were customarily employed. Since the particles also had desirable physical properties and were readily prepared, little interest was shown in novel catalyst sizes and shapes.

Recent shortages in petroleum supplies coupled with increased demand for products thereof have necessitated reliance on secondary sources in increasing amounts. These secondary sources require more extensive hydrotreating and are more difficult to process. Use of conventional spherical or cylindrical catalyst particles does not result in efficient hydrotreating of secondary petroleum sources, particularly residuum. Recourse, therefore, must be had to more effective catalysts and/or hydrotreating processes if the shortages are to be alleviated by resort to secondary petroleum sources.

It is known that increased catalyst activity results from reduced catalyst particle size. It is also known that with conventional catalyst shapes, a decrease in particle size results in an increase in pressure drop across the catalyst bed. Accordingly, with respect to the tolerable pressure drops, there is a minimum particle size of catalyst particles that can be employed using conventional shapes. Large pressure drops result from close packing of the catalyst particles in the bed with substantial elimination of the void fraction of the bed.

It is known that the void fraction of catalyst beds can be increased by using catalyst particles of irregular shapes so as to minimize close packing of the particles. However, such use generally results in loss in bed efficiency because of the resulting lower volume of catalyst particles in a given volume of reactor space.

In U.S. Pat. No. 3,674,680 issued July 4, 1972 to Hoekstra et al., there is disclosed a process for hydrotreating petroleum residuum by use of small catalyst particles having both distinctive shape and a majority of pores of a diameter of 100 to 200 Angstrom units. This patent is based on the discovery that metallic contaminants present in the resids processed penetrate to a depth of 0.0085 inch from the particle surface and the presumption that reside molecules do not penetrate much further. Thus, an ideal catalyst, according to the patentees, would be one which has all points in the catalyst particle no greater than about 0.0085 inch from the particle surface so as to eliminate any wasted catalyst material from the reactor. Such a catalyst particle would have an effectiveness approaching 1.0 due to the elimination of unused or wasted catalyst material. The patentees further point out that a cylinder of one-sixteenth inch diameter has an effectiveness of only 55% that of the ideal catalyst defined. The patentees teach that if the catalyst particle occupies only 70% to 90% of the volume of the comparable cylinder and has a major portion of pores in the range of 100–200 Angstrom units, small particles can be used without excessive pressure drop and the metallic contaminates will be deposited in the catalyst particles up to a depth of about 0.0085 inch from any particle surface.

It is known that catalyst area containing deposited metallic contaminants is inactivated by said contaminates. Accordingly, for the catalyst of Hoekstra, et al. to remain active after deposition of the metallic contaminants it must contain additional catalytic area to provide activity. This active area can only exist within the catalyst particles at a depth greater than about 0.0085 inch from any particle surface. Although this inner space is considered wasted in the initial catalyst because it is at a depth greater than 0.0085 inch from any particle surface, it is evident that the space at a depth less than 0.0085 inch from any particle surface is wasted because of inactivation by the presence of metallic contaminants therein and that the inner space, initially considered wasted, can be the only active catalyst space for continuing hydrotreating reaction after metallic contamination occurs. Accordingly, although the small-size catalyst particles of Hoekstra et al. are shaped so as to minimize pressure drop, the large pores provide for deposition of contaminants, and relatively small inaccessible catalyst sections remain. As a result, the catalyst particles of Hoedstra et al. do not provide improved activity activity over catalyst particles of conventional shape.

In U.S. Pat. No. 3,509,044, issued Apr. 28, 1970 to C. E. Adams et al., it is shown that the use of catalyst particles having a major portion of pores of diameter in the range of 30–70 Angstrom units in the hydrotreating of residuum results in a longer service life of said catalyst particles than that of catalyst particles of other pore diameters. However, ever, Adams et al. do not teach small particles of special shape and do not provide catalyst particles having improved activity during service use over conventional catalyst.

In accordance with the present invention, there is provided a porous hydrotreating catalyst particle having a composition of a major portion of alumina; up to about 36 weight percent of silica, based on the total weight of silica and alumina; from about 10 to 25 weight percent of molybdenum in the form of its oxide or sulfide; and a total of about 1 to 8 weight percent of a metal selected from cobalt, nickel and mixtures thereof in the form of the corresponding oxide or sulfide, said percentages being based on the total weight of said catalyst particle: said particle being further characterized by a concave cross-sectional base extending over a length to define a concave geometric solid said solid being characterized by a concavity index greater than 1.0; a void fraction in the range of about 0.25 to 0.60; a particle size defined by a ratio of geometric volume to geometric surface in the range of about 0.001 to 0.042 inch; a catalytic surface area greater than about 150 square meters per gram; and a catalytic pore volume in the range of about 0.35 to 0.85 cubic centimeters per gram, said catalytic pore volume resulting from a major portion of pores of diameter in the range of about 40 to 90 Angstrom units when measured with mercury at up to 50,000 pounds per square inch absolute pressure and a contact angle of 140°.

In preferred embodiments of the present invention, there is provided a porous hydrotreating catalyst particle having a composition of a major portion of a alumina; up to about 36 weight percent of silica, based on the total weight of silica and alumina; from about 10 to 25 weight percent of molybdenum in the form of its oxide or sulfide; and a total of about 1 to 8 weight percent of metal selected from cobalt nickel and mixtures thereof in the form of the corresponding oxide or sulfide, said percentages being based on the total weight of said catalyst particle: said particle being further characterized by a trilobal cross-sectional base extending over a length to define a concave geometric solid, said solid being characterized by a concavity index in the range of 1.05 to 1.45; a void fraction in the range of about 0.35 to 0.50; a particle size defined by a ratio of geometric volume to geometric surface in the range of about 0.005 to 0.025 inch; a catalytic surface area greater than 200 square meters per gram; and a catalytic pore volume in the range of about 0.35 to 0.85 cubic centimeters per gram, said catalytic pore volume resulting from a major portion of the pores of diameter in the range of about 40 to 90 Angstrom units when measured with mercury at up to about 50,000 pounds per square inch absolute pressure and a contact angle of 140°; said trilobal cross-sectional base being such that the lobes are defined by circles having centers and equal diameters, the centers of which circles are spaced from each other so that lines joining said centers form an equilateral triangle, the sides of which are of a dimension which is from about three-eighths to about equal that of the circle diameters and all cross-sectional base included by said circles and triangle is of said catalyst composition.

In accordance with the process aspect of the present invention, there is provided a process for hydrotreating a petroleum residuum with the shaped, porous catalyst as described above, which process comprises contacting said residuum with the catalyst particle in the presence of hydrogen at a flow rate of about 500 to 5,000 standard cubic feet per barrel of oil at a liquid hourly space velocity of about 0.10 to 5.0 reciprocal hour, a temperature in the range of about 600 to 850° F., and a total pressure in the range of about 200 to 10,000 pounds per square inch gauge.

Unexpectedly, the catalyst particles of the present invention are higher in activity in hydrotreating residuum and maintain higher activity for longer times of service than do comparable catalyst particles of the prior art of similar size. In addition, the catalyst particles of the present invention possess greater crush strength and attrition resistance than do comparable catalyst particles of the prior art.

In order that the size and shape characteristics of the catalyst particle of the present invention may be clearly understood, the following discussion is given.

GENERAL NATURE

A cylinder may be defined as a solid of uniform cross-section which may be generated by a straight line moving round a closed curve and remaining parallel to the axis. What is genrally understood by the word is a right circular cylinder for which the closed curve is a circle whose plane is perpendicular to the axis of the cylinder.

The catalyst particle of the present invention differs from the right circular cylinder only in that the closed curve is not circle but is concave closed curve. A concave closed curve is one such that two points within or on the edges of the curve can be joined by a straight line which does not lie wholly within the closed curve. Typical closed curves of the catalyst particles of the present invention are ring shape or of various forms of polylobal shapes. Thus, in the present invention, the catalyst particle has a concave cross-sectional base, which base is perpendicular to the axis of the solid and extends for a sufficient length to provide the solid particle. The cross-sectional base of the catalyst particles of the present invention has a area less than that of a ⅛ inch diameter circle and the ratio of the particle length to its nominal diameter is generally from about 2:1 to about 5:1. The actual size relationships of the particles of the invention are more accurately given by the ratio of geometric volume to geometric surface, which will be discussed hereinbelow.

When the cross-sectional base is polyobal, which represents the preferred embodiment, the lobes of the base arise from circle of equal diameter and are connected so as to form a closed curve. The centers of the circles making up the lobes may be spaced at various distances from one another, depending upon the nature of the polyobal shape desired. In one embodiment, the circle centers may be spaced more than a diameter apart and the space between the circular lobes if filled with the catalyst composition of the lobes to a thickness which is at least equal to a circle radius. The spacing of the circle centers in such embodiment may be up to about 2½ circle diameters. In an alternative embodiment, the circle centers are spaced from about ⅜ to 1 circle diameter apart and all space between the lobes is filled with he catalyst composition of the lobes to a thickness which is at least equal to a circle radius. In this alternative embodiment, at many spacing distances sufficient overlapping of the circular lobes will occur so as to provide the necessary thickness of catalyst composition between lobes.

In a more preferred embodiment, the cross-sectional base will consist of three or more lobes of circles of equal diameter, the centers of which circles are spaced from each other by a distance which is from about ⅜ to about 15/16 of a circle diameter and lines joining the circle centers form a regular polygon, each side of which is equal in length to the spacing distance of the circle centers and all area occupied by the lobes and polygon is of the catalyst composition. A greatly preferred polylobal cross-sectional base in one of three lobes of circles of equal diameter, the centers of which circles are spaced so as to form an equilateral triangle each side of which is about 15/16 of a circle diameter.

The catalyst particles of the present invention are prepared by a molding technique, such as by extrusion. The molded particle is also subjeced to calcination, during which a shrinkage in dimensions of 25% or more may occur. Due allowance, of course is necessary to provide finished catalyst particles of the size desired. The shrinkage may also cause some distortion from the desired shape, i.e. the final particles may depart somewhat from the desired idealized shapes. However, the extent to which distortion occurs does not adversely affect catalyst properties and the definition of the catalyst shape is in terms of the idealized dimensions although it is recognized that some distortions may occur.

CONCAVITY INDEX

A geometric solid is convex if all pairs of points lying within or on the cross-sectional surface of the solid can be connected by a straight line which is completely contained within or on the surface thereof. Conversely, a geometric solid is concave is pairs of points lying within or on the cross-sectional surface of the surface of the solid can be connected with a straight line which is not completely contained within or on the surface of the solid. The geometric volume of a convex solid of the minimum size necessary to contain a concave solid will be greater than the geometric volume of the concave solid. Letting $V_x$ equal the volume of the minimum convex solid specified and $V_c$ equal the volume of the contained concave solid, the Concavity Index C, is is given by the expression:

$$C = V_x/V_c$$

In order for the geometric solid to be concave, the value of Concavity Index must be greater than 1.0 and preferably is about 1.10 t 1.45

VOID FRACTION

The void fraction represents the closeness of particle packing that can be obtained with particles of a given shape. In a given geometric volume of space, a specific number of catalyst particles can be packed. Multiplying the geometric volume of the particle by the number of particles, a total geometric particle volume, $V_p$, is obtained. If the apparent geometric volume is space packed is $V_s$, there will exist void space $V_v$, not actually occupied by catalyst particles Thus, $V_s = V_p + V_v$. The Void Fraction, E, associated with a given shape is given by the expression:

$$E = V_v/V_v = V_v/V_v = V_p$$

In order for a catalyst particle to be useful, in accordance with the present invention, it must have a void fraction in the range of about 0.25 to 0.60, preferably between about 0.35 and 0.50.

RATIO OF GEOMETRIC VOLUME TO GEOMETRIC SURFACE

Catalyst particles of the present invention have a characteristic geometric volume and geometric surface are associated therewith as a consequence of their cross-sectional shape and length. The geometric volume and geometric surface area are readily calculated from appropriate measurements associated with the perfect geometric forms. Actual catalyst particles approximate such forms and their volumes and surface areas can be closely estimated from the corresponding geometric models. The ratio of geometric volume to geometric surface area is indicative of particle size and should be in the range of about 0.001 and 0.042 inch, preferably between about 0.005 and 0.025 inch.

In addition to the geometric considerations reflecting particle size and shape, it is also necessary for the catalyst particles to possess certain characteristics that are associated with catalytic action. These characteristics and methods of measurement are next given.

CATALYTIC SURFACE AREA

The catalytic surface area is expressed in square meters per gram and is determined in accordance with the procedure described by H. W. Daecher and F. H. Stross in Anal. Chem., Vol. 34, page 1150, 1962. This value should be greater than about 150 square meters per gram, preferably greater than 200 square meter per gram, and more preferably from about 250 to 300 square meters per gram.

CATALYTIC PORE VOLUME

The catalytic pore volume of the catalyst represents internal cavities therein. Measurements are made by conventional procedure based on mercury penetration at up to 50,000 pounds per square inch absolute pressure using the contact angle of 140°. In this procedure, both total pore volume and pore diameter are determined. Catalyst particles of the present invention will have a total pore volume in the range of about 0.35 and 0.85 cubic centimeters per gram with the majority of the pores having a diameter in the range of about 40 to 90 Angstrom Units in accordance with the method of determination specified.

In addition to the geometric size and shape relationships and the catalytic characteristics, the catalyst particles will also have a specific chemical composition, which is next discussed.

The catalyst particles will comprise a major portion of alumina and, in particular, small-pore alumina so as to be consistent with the catalytic characteristics specified above. The alumina will thus be the major structure-forming component of the catalyst particles. In addition to alumina, the catalyst particles may contain up to about 36 weight percent of silica, based on the total weight of silica and alumina. The amount of silica added as such will generally be up to about 5 weight percent, same basis. When added in the form of aluminosilicate, such as zeolite, it may be as high as about 45 weight percent of zeolite, thus giving rise to about 36 weight percent of silica, as indicated.

The catalyst particles will also contain from about 10 to 20 weight percent of molybdenum in the form of its oxide or sulfide and a total of about 1 to 8 weight percent of a metal selected from cobalt and nickel and mixtures thereof in the form of its oxide or sulfide. These constituents serve as activator and promoter materials and are based on the total weight of the catalyst particle. It is to be understood that when both nickel and cobalt are present, their combined weight percent should be in the range given.

In preparing the catalyst particles of the present invention, precipitated alumina is prepared in accordance with conventional procedures, well-known in the art. After filtration, washing and adjustment in composition as may be desired, the aqueous slurry is spray-dried in accordance with conventional procedures. The spray dried powder may then be prepared as an extrusion mix, incorporating therein, if desired, the activator and promoter ingredients. Typically, mix-mulling is employed in providing the extrusion mix. The extrusion mix is then extruded through a die having orifices of the desired cross-sectional shape and the extrudate is cut to the proper length to provide the desired shape characteristics specified. The extrudate is then subjected to drying and calcination in conformity with conventional procedures. If provision for activator and promoter incorporation was not made prior to extrusion, the calcined extrudate may be suitably treated with activator and promotor materials and again calcined, in accordance with conventional procedures. Advantageously, preparation of catalyst particles of the present invention requires no new processing steps, but merely requires conventional processing directed to the novel combination of geometric, catalytic and compositional features of the catalyst particles as described.

In addition to extrusion, catalyst particles of the present invention may be prepared by other procedures. For example, the shaped articles can be obtained by tabletizing or pelletizing, or molding, etc.

The catalyst particles prepared as described after preliminary sulfiding are useful in hydrotreating petroleum residuums. In hydrotreating reactions, several effects are observed. Primarily, hydrodesulfurization is accomplished. Hydrocracking, to a limited extent, nitrogen removal and aromatic saturation may also occur. Accordingly, hydrotreating is the preferred term used to describe the catalytic reaction effected since it is generic as to the effects observed.

In carrying out the process of the present invention, a petroleum residuum is contacted with the catalyst particles described in the presence of hydrogen gas at specified values of temperature, pressure, and space velocity. The catalyst particles are usually present in the form of a fixed bed and generally several beds are employed. The hydrogen gas and residuum are mixed and fed downward through the catalyst bed. Catalyst bed size and residuum flow rate are adjusted so as to provide a liquid hourly space velocity in the range of about 0.10 to 5.0 preferably 0.2–0.8 reciprocal hour. Hydrogen flow rate is from about 500 to 5000 standard cubic feet per barrel of oil preferably 2000–4000. The reaction temperature is in the range of about 600° to about 850° F. preferably 650°–750° F. and the total pressure is from about 200 to 10,000, preferably 600 to 1000 pounds per square inch guage.

By using the catalyst particles of the present invention in the hydrotreatment of petroleum residuum according to the process described, improved hydrodesulfurization activity compared to prior art catalysts is obtained. In addition, the catalyst particles of the present invention exhibit a greater stability of activity on extended use than prior art catalysts. These results are highly unexpected in view of the fact that prior art teachings indicate that large-pore alumina is required to prevent rapid catalyst deactivation in hydrotreating of petroleum residuums, which normally contain metallic contaminants. Quite the contrary to such teachings, the present invention provides greater stability of catalyst activity in hydrotreating such residuums and, at the same time, provides a greater activity throughout normal use.

The invention will be more fully understood by reference to the accompanying drawings in which.

Figure 12:
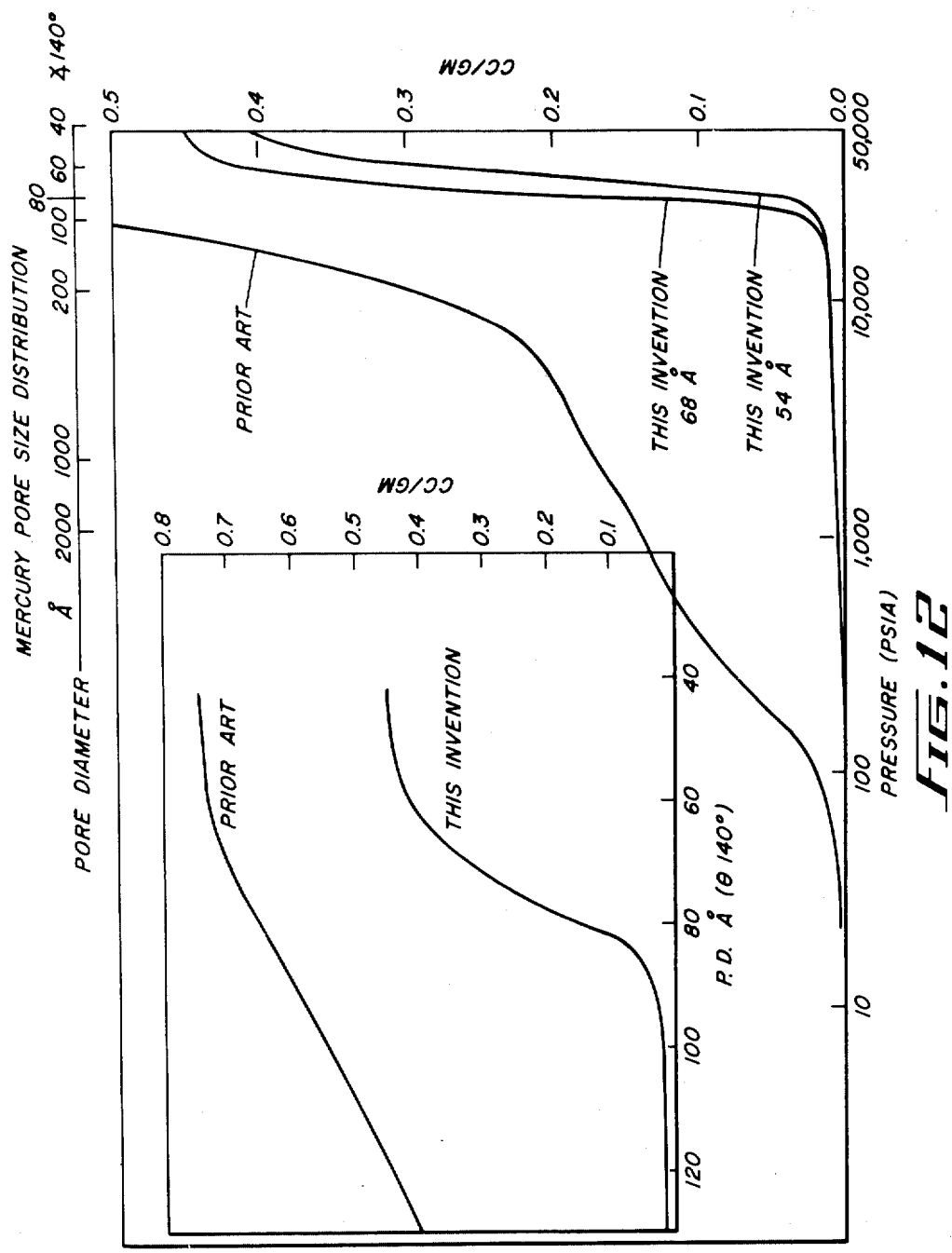
Figure 13:
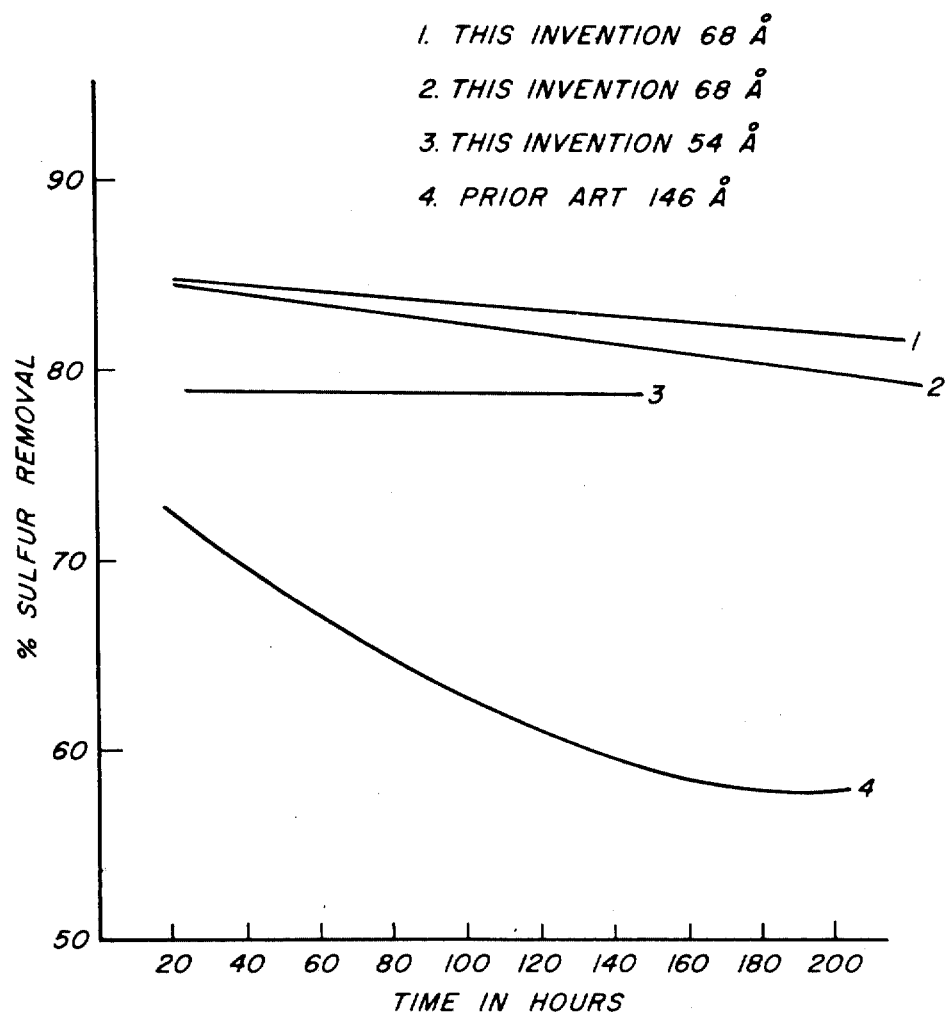

FIG. 12 represents mercury penetration of catalyst particles in pore volume and the pore size distribution analysis, the larger curves showing the complete pore size distribution and the smaller curves showing a magnification of the distribution of pore volume in the smaller pores; and FIG. 13 is a graph of sulfur removal against time of service use for catalysts of the present invention and a comparative catalyst in hydrotreating of petroleum residuum.

The invention is more fully illustrated by the examples which follow wherein all parts and percentages are by weight unless otherwise specifically illustrated.

The examples are divided into groups distinguished by either a letter or number designation. The lettered examples illustrate catalyst particle use in hydrotreating processes involving fuel oils while the numbered examples illustrate catalyst particle use in hydrotreating processes involving petroleum residuums. In both groups of examples, advantages in activity as a result of catalyst shape are shown. In the lettered group of examples, no specific advantages with respect to pore diameter are apparent so that details as to pore diameter are not presented. In the numbered groups of examples, where specific advantages result from pore diameter, these values are given. Thus, the numbered examples illustrate the combination of various characteristics of catalyst particles that constitute the product aspect of the present invention and illustrate hydrotreating of petroleum residuum using the catalyst particles of the invention, which constitute the process aspect of the present invention.

EXAMPLES A–G

A series of shaped particles were made as follows:

One thousand thirty gallons of water are charged to an agitated tank. 3,940 lbs. of sodium aluminate solution (28% $Al_2O_3$, about 15% excess $Na_2O$) and 5,430 lbs. of aluminum sulfate solution (7.8% $Al_2O_3$) are metered into the water heel and aluminum hydroxide is precipitated.

The pH of the resulting alumina slurry above is adjusted to 10.5 and it is filtered and washed over a rotary vacuum filter to remove the sulfate. Nitric acid is added to the repulped washed cake to adjust the pH down to 7.0–7.5. The pH adjusted slurry is washed over another filter to remove the sodium ions.

The resulting washed slurry above is spray dried.

The spray dried alumina powder (1 Part) is charged to the muller along with 1.2 parts of water. Thereafter 0.78 part of ammonium molybdate solution (28% $MoO_3$) followed by 0.30 part of cobalt nitrate solution (16% CoO) are added to the mix.

The batch is mixed for a period of about 10–15 minutes, then 0.21 part (ignited basis) of alumina powder is added to the mix, after which the batch is mulled for an additonal 10–15 minutes.

Using an extruder the muller mix is forced through a die of the desired shape. The extrudates are dried in an oven to about 20% loss of ignition, and then calcined at a temperature of 1,200° F. for 1 hour.

The above procedure is a procedure used to produce Examples H, I, J and K referred to below. Examples A, B, C, D, E, F, and G, and L and M are prepared in essentially the same manner except that the cobalt nitrate solution and ammonium molybdate solution usage would be adjusted to give a 6% CoO-12% $MoO_3$ content as opposed to 3% cobalt oxide-15% molybdenum oxide content of Examples H - K. In this series normal "1/16" and "⅛" inch extrudates (cylinders) were made for reference purposes. These catalysts and catalysts of this invention are compared employing the following described Gas Oil Test for desulfurization and denitrogenation.

GAS OIL TEST

GAS OIL DESCRIPTION

Gravity = 23.3° API
Boiling Range = 490°–847° F.
Sulfur Content = 1.0%
Basic Nitrogen Content = 515 ppm The catalyst is charged into the reactor by volume. Two 25 cc catalyst beds are used in series. Each of these beds is diluted with glass beads to a total of 100 cc's. The beds are separated with glass wool plug.

The catalyst is then presulfided as follows:

1. The reactor is heater to 600° F. in flowing nitrogen at atmospheric pressure.
2. At 600° F. the nitrogen is stopped and a mixture of 90% $H_2$ plus 10% $H_2S$ by volume is passed over the catalyst at 0.85 SCF/hr. for 30 minutes.
3. The reactor temperature is then raised to 700° F. and held for 2 hours with the $H_2/H_2S$ mixture as in 2.
4. After 2 hours the reactor temperature is reduced to 450° F. with $H_2/H_2S$ flowing. This completes the presulfiding.

The process conditions used are as follows:
Temperature = 650° and 725° F.
Pressure = 750 psig
Space Velocity = 2 LHSV p1 Hydrogen Recycle Rate = 1,000 SCF/Bbl Three samples are collected at each temperature. These samples are scrubbed with nitrogen and a portion is then analyzed for basic nitrogen by U.O.P. method 269–59. The remaining portion of the sample is washed with distilled water three times then analyzed for sulfur. Since this is a diffusion influenced reaction the size of the particle affects it activity. Results for these two cylinders (⅛ inch and 1/16 inch extrudates) are used to establish the diffusion curve. Activities obtained with shaped particles are then compared to the diffusion curve at equal particle size. In order that different shaped particles can be readily compared, particle size is defined in terms of its volume to external surface ratio, $V_p/S_p$.

Figure 6:
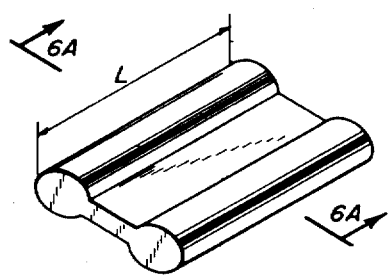
FIG. 6 is a "dumbbell" configuration of this invention wherein the dimensions are L = 0.202 inch, D = 0.0473 inch, l = 0.0532 inch and d = 0.0264 inch.
Figure 6A:
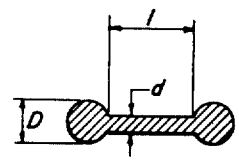
Figure 7:
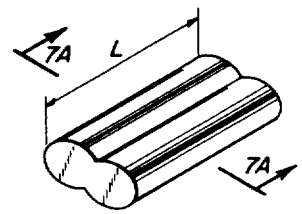
FIG. 7 is a dilobal configuration of this invention wherein the dimenasions are L = 0.1814 1 inch, D = 0.092 inch, and d = 0.0541 inch.
Figure 7A:
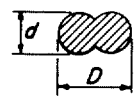
Figure 8A:
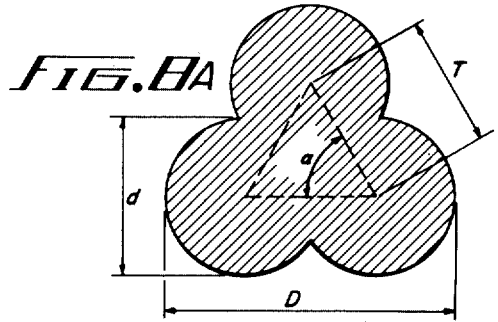
FIG. 8 is a three-leaf clover or trilobal configuration of this invention wherein the dimensions are L = 0.212 inch, D = 0.0919 inch, $d$ = 0.0427 inch, T = 0.0442 inch, and $\alpha$ = 60°.
Figure 8:
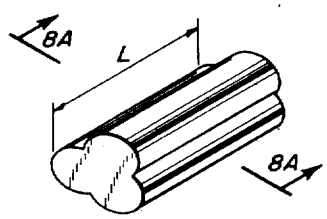
Figure 9:
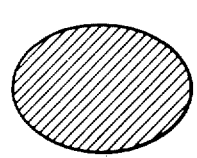
FIG. 9 is an undimensioned oval convex configuration not contemplated by this invention.
Figure 10:
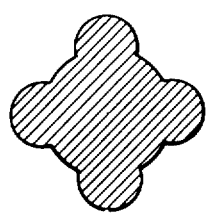
FIG. 10 is an undimensioned tetralobal configuration of this invention.
Figure 11:
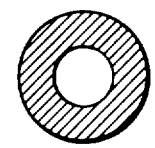
FIG. 11 is an undimensioned ring or "donut" configuration contemplated by this invention.

In this study two (2) shapes other than cylinders were made. One of these has been designated the "dumbbell". The other has been termed a "3-leaf clover" or "trilobe". The particular dumbbell is illustrated in FIG. 6 of the accompanying drawings and the particular trilobe is illustrated in FIG. 8.

In Table I set forth below activity results for these catalysts are shown. Equal volumes of the catalyst are charged and both sulfur and nitrogen removals are measured at two temperatures as described above. Recent calculations have shown that at both 650° F. and 725° F. the reactor operates in the "trickle" phase (hydrocarbon exists as both liquid and vapor). In series I (Catalyst A–D) the catalysts were calcined in a common batch. The Series II catalyst (Catalyst E–G) were calcined in separate batches. Activity results are displayed in terms of percentage removals and relative activities on both a weight and volume basis. The relative activities are the most meaningful numbers. They are simply defined as the ratio of second order rate constants (catalyst activity) for the catalyst of interest to that of the reference catalyst. In each series the 1/16 inch cylinder was the reference catalyst, i.e. defined to have 100 activity. Relative activities can be simply interpreted as the percentage of activity of the reference catalyst.

In Series I both the relative weight and volume sulfur activities of the shaped particle are greater than that of the one-sixteenth inch cylinder. In Series II, with the exception of one data point which is not believed to be statistically significant, a similar advantage for sulfur removal is evident. Although the two series do not agree exactly (possibly due to differences in calcination) their average results show that the shaped particles have more sulfur removal activity on both a weight and volume basis.

In Table II, set forth below, the physical properties of the catalysts are given. The significant dimension in terms of generalized particle size is the $V_p/S_p$ ratio. This ratio shows that the order of increasing size is: 1/16 inch Cyl.<dumbbell<trilobe<⅛ inch cyl. With respect to diffusion the relative activities should increase with decreasing $V_p/S_p$. The Gas Oil Test Results, however, do not correlate with $V_p/S_p$. Rather, they show an unexpected advantage for the shaped particles. If another mode of mass transfer is affecting the results, bulk mass transfer, then one might expect that the Gas Oil Test results should correlate with total geometric surface (total surface in Table II). However the activity results do not correlate with total surface and again show an unexpected advantage for shaped particles. The ABD values show that the dumbbells pack much more loosely than the other particles.

Figure 1:
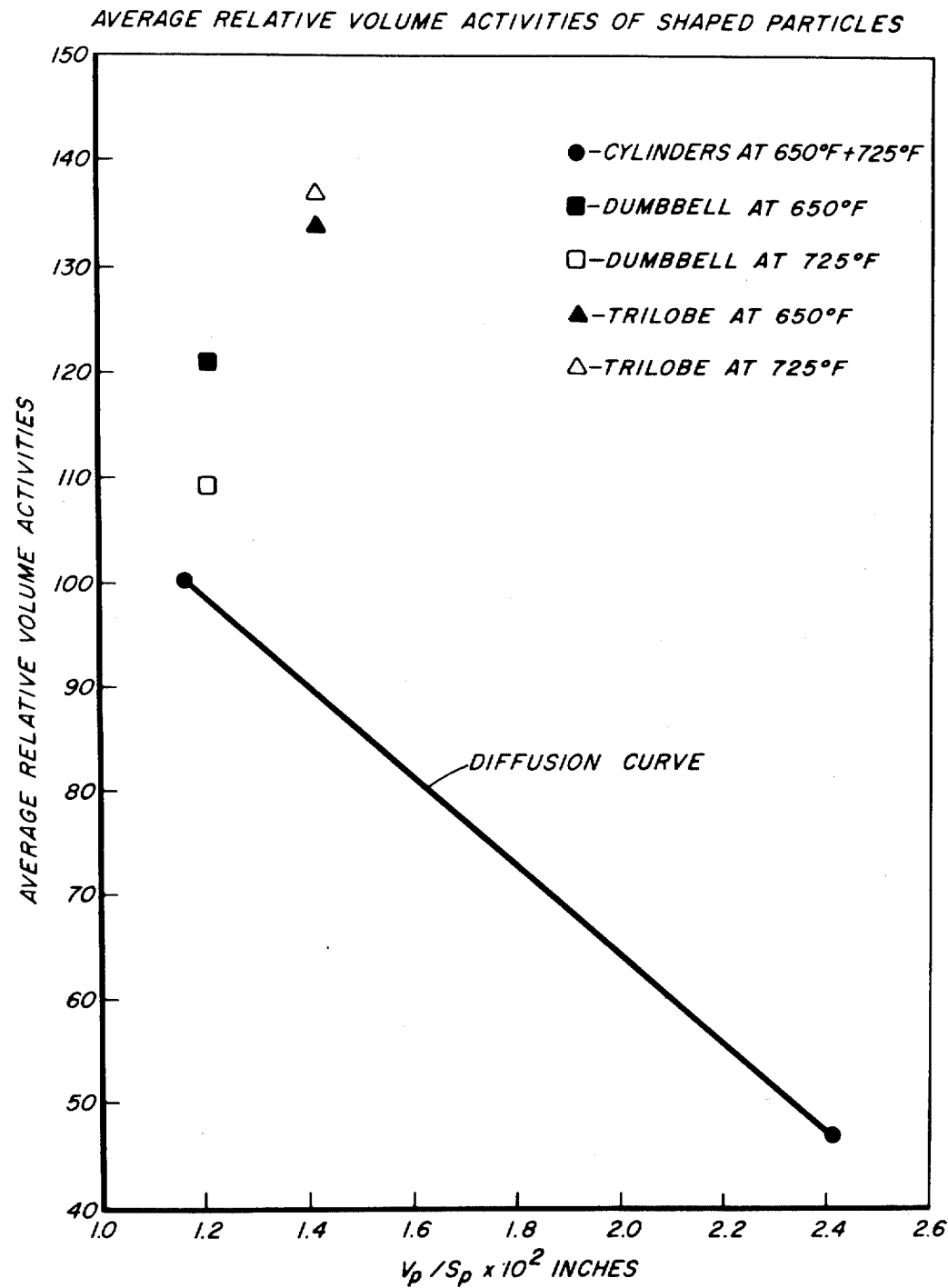
FIG. 1 is a graph comparing the Average Relative Volume Activities of shaped catalyst particles contemplated by the present invention with conventional catalyst particles of the prior art.

In FIG. 1 of the accompanying drawings the average relative volume activities are plotted vs. particle size. The straight line shown is the diffusion curve obtained from the cylinders. It agrees with theory. Both the dumbbell and the trilobe are above this curve which is a surprising result. The dumbell is not as active as the trilobe on this volume basis at least in part because of its low ABD.

Figure 2:
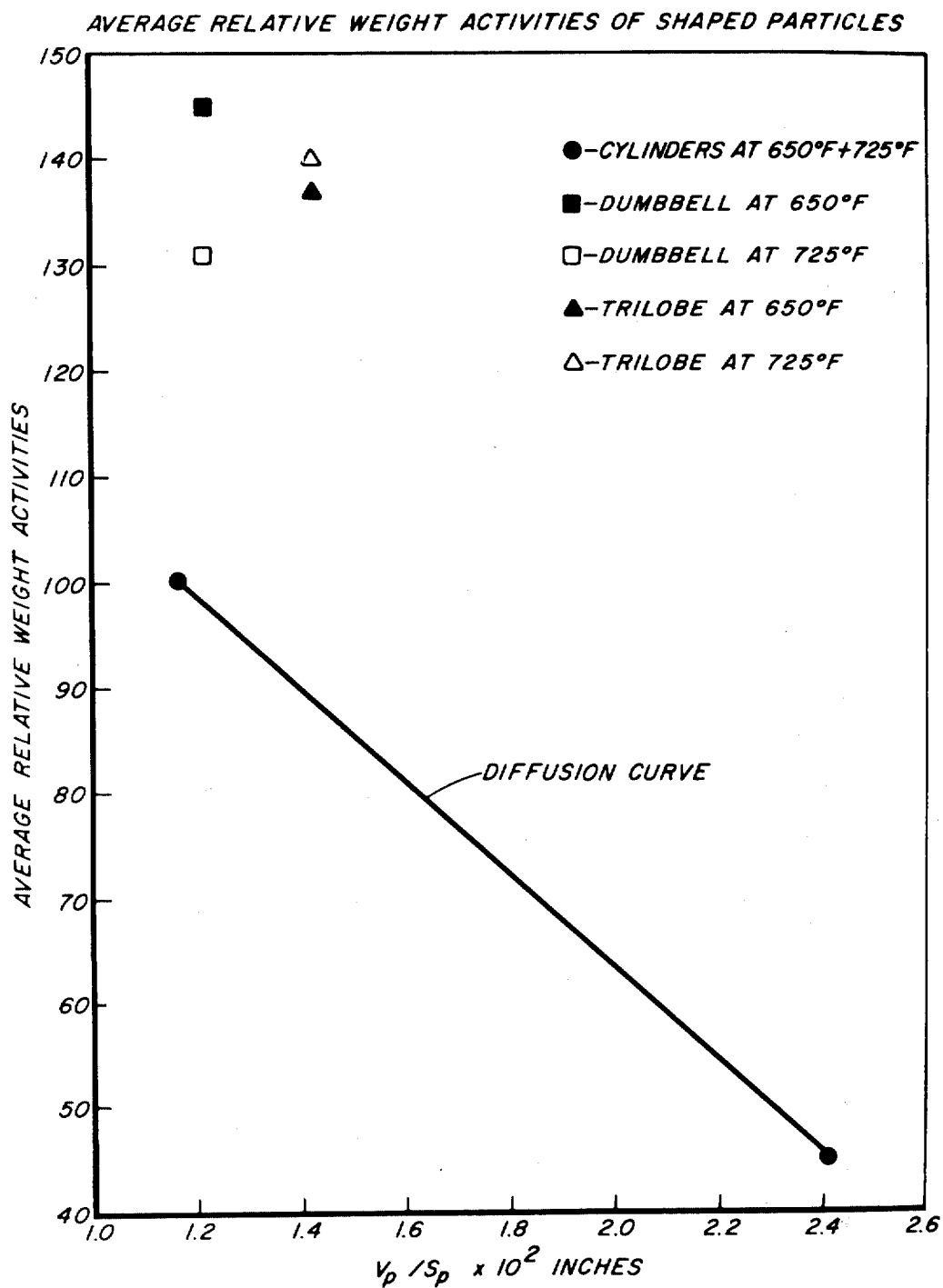
FIG. 2 is a graph comparing the Average Relative Weight Activities of the same catalyst particles considered in FIG. 1.

A similar graph for weight activities is shown in FIG. 2. Both shapes are significantly above the diffusion curve and have approximately the same activity.

Finally in Table III pressure drop data are shown for the shaped particles compared to the one-sixteenth inch cylinder. Both absolute pressure drops and relative pressure drops as a function of flow rate are given. In this test 50 cc of catalyst is loaded into a tube and the pressure drop from flowing air is measured. Both shaped particles of this invention show about the same pressure drops and a significant pressure drop advantage (about 40% lower at the more important flow condition) compared to the one-sixteenth inch cylinder. For the dumbbell the lower pressure drop is a direct result of its low ABD. For the trilobe the lower pressure drop is a result of its increased size (Vp/Sp) and slightly lower ABD.

HEATING OIL TEST

HEATING OIL DESCRIPTION

Gravity = 34.2° API.
Boiling Range = 435°–628° F.
Sulfur Content = 1.4%
Basic Nitrogen = 35 ppm The catalyst is charged to the reactor by volume. Two 25 cc catalyst beds are used in series. Each of these beds is diluted with glass beads to a total 55 cc's. The beds are separated with a glass wool plug.

The catalyst is then presulfided via the following scheme:

1. The catalyst is heated from room temperature to 700° F. in a mixture of 10% $H_2S$ plus 90% $H_2$ flowing at 5 SCF/Hr. at atmospheric pressure.
2. The catalyst is then held at 700° F. in this mixture for 1 hour.
3. The reactor temperature is then lowered under flowing hydrogen to 600° F.

The process conditions used are as follows:
Temperature = 600, 700° F.
Pressure = 500 psig
Space Velocity = 4 LHSV
Hydrogen Recycle Rate = 1,000 SCF/Bbl Three samples are collected at each temperature. These samples are scrubbed with caustic:water:caustic and finally water again. They are then sent for sulfur analysis.

Figure 3:
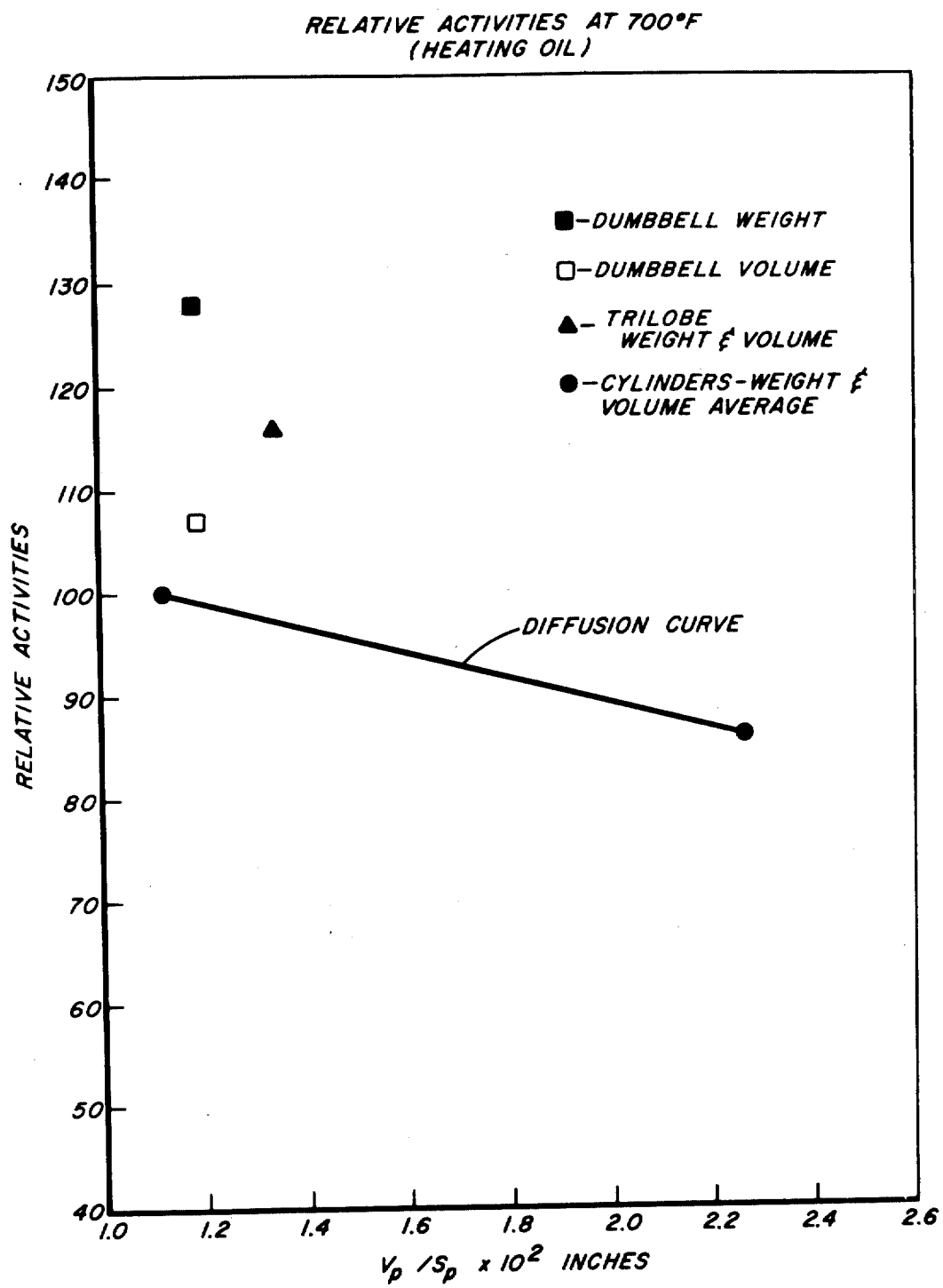
FIG. 3 is a graph comparing the Relative Activities of catalyst particles of the present invention with those of catalyst particles of the same composition having conventional configuration, the comparisons being under prescribed conditions.

The activity results are shown in Table IV. The results show an advantage for shaped particles. A graphical presentation of the data is given in FIG. 3 for the 700° F. point. Activities for the shaped particles are above the diffusion curve. Finally, physical properties of the catalyst compared are given in Table V.

TABLE I

GAS OIL TEST ACTIVITY RESULTS

| | | % Removals | | | | Relative Activities | | | | | | |
|---|---|---|---|---|---|---|---|---|---|---|---|---|
| | | | | | | Volume Basis | | | | Weight Basis | | | |
| Catalyst | | Sulfur | | Nitrogen | | Sulfur | | Nitrogen | | Sulfur | | Nitrogen | |
| | Description | 650F | 725F | 650F | 725F | 650F | 725F | 650F | 725F | 650F | 725F | 650F | 725F |
| SERIES I | | | | | | | | | | | | | |
| A | "1/16" Cylinder | 85.6 | 97.5 | 0 | 30.6 | 100 | 100 | — | 100 | 100 | 100 | — | 100 |
| B | Dumbbell | 86.8 | 98.1 | 0 | 25.2 | 111 | 133 | — | 79 | 130 | 159 | — | 93 |
| C | Trilobe | 86.3 | 97.8 | 1.6 | 33.2 | 106 | 114 | — | 110 | 109 | 117 | — | — |
| D | "1/8" Cylinder | 71.6 | 95.2 | — | — | 42 | 51 | — | — | 41 | 49 | — | — |
| SERIES II | | | | | | | | | | | | | |
| E | "1/16" Cylinder | 82.2 | 97.6 | — | — | 100 | 100 | — | — | 100 | 100 | — | — |
| F | Dumbbell | 85.8 | 97.2 | — | — | 131 | 85 | — | — | 159 | 103 | — | — |
| G | Trilobe | 88.2 | 98.5 | — | — | 162 | 161 | — | — | 164 | 163 | — | — |
| AVERAGE I & II | | | | | | | | | | | | | |
| "1/16" Cylinder | | — | — | — | — | 100 | 100 | — | — | 100 | 100 | — | — |
| Dumbbell | | — | — | — | — | 121 | 109 | — | — | 145 | 131 | — | — |
| Trilobe | | — | — | — | — | 134 | 137 | — | — | 137 | 140 | — | — |
| "1/8" Cylinder | | — | — | — | — | 42 | 51 | — | — | 41 | 49 | — | — |

TABLE II

PHYSICAL PROPERTIES

| Catalyst | Length (in) | Dia. (in) | Volume Particle Vp (in)³ | Surface Particle Sp (in)² | Vp/Sp (in) | Total Surface area (in)² | PV cc/g | ABD g/cc | CBD g/cc | CS lbs. | CS/L lbs/in |
|---|---|---|---|---|---|---|---|---|---|---|---|
| A | "1/16" Cylinder | 0.216 | 0.052 | 0.00046 | 0.0398 | 0.0117 | 176 | 0.55 | 0.66 | 0.72 | 21.5 | 101 |
| B | Dumbbell | 0.202 | — | 0.00096 | 0.0798 | 0.0121 | 124 | 0.56 | 0.57 | 0.60 | — | — |
| C | Trilobe | 0.212 | — | 0.00111 | 0.0782 | 0.0142 | 128 | 0.57 | 0.65 | 0.69 | 31.3 | 148 |
| D | "1/8" Cylinder | 0.215 | 0.125 | 0.00262 | 0.1084 | 0.0241 | — | .57 | .67 | .73 | 29 | 13 |

TABLE III

PRESSURE DROP

| Nominal Air Flow SCFM | A "1/16" Cylinder | | B Dumbbell | | C 3 Leaf Clover | |
|---|---|---|---|---|---|---|
| | ΔP "H₂O" | Relative ΔP, % | ΔP "H₂O" | Relative ΔP, % | ΔP "H₂O" | Relative ΔP, % |
| 0;115 | 1.5 | 100 | 0.94 | 61 | 0.98 | 64 |
| 1 | 4.0 | 100 | 2.6 | 64 | 2.6 | 64 |
| 2 | 15.7 | 100 | 11.2 | 71 | 11.1 | 71 |
| 3 | 36.4 | 100 | 27.0 | 75 | 26.3 | 72 |

EXAMPLES H–J

Additional examples for shaped catalytic particles are herein reported. A muller mix prepared as described above of a 3% cobalt oxide, 15% molybdenum oxide balance alumina was used to extrude these particles one-sixteenth, ⅛ inch cylinders, dumbbell and trilobe). Activities were obtained on a Heating Oil Test described below:

TABLE IV

HEATING OIL RESULTS

| Catalyst ID | Description | % Sulfur Removal 600° F | % Sulfur Removal 700° F | % Relative Activities Volume 600° F | % Relative Activities Volume 700° F | % Relative Activities Weight 600° F | % Relative Activities Weight 700° F |
|---|---|---|---|---|---|---|---|
| H | "1/16" inch cylinder | 46.1 | 86.5 | 100 | 100 | 100 | 100 |
| I | Dumbbell | 43.0 | 87.3 | 88 | 107 | 106 | 128 |
| J | Trilobe | 49.6 | 88.1 | 115 | 116 | 115 | 116 |
| K | 1/8" Cylinder | 44.0 | 85.0 | 92 | 88 | 87 | 83 |

TABLE V

PHYSICAL PROPERTIES

| I.D. | Description | Length (in.) | Dia. (in.) | Volume particle $V_p$ (in.)³ | Surface particle $S_p$ (in.)² | $V_p/S_p$ (in.) | PV cc/g | ABD g/cc | CBD g/cc | CS lbs. | CS/L lbs./in. |
|---|---|---|---|---|---|---|---|---|---|---|---|
| H | "1/16" inch Cylinder | .142 | .053 | .000316 | .0282 | .0112 | .50 | .71 | .76 | 12.3 | 93 |
| I | Dumbell | .177 | — | .000838 | .0704 | .0119 | .50 | .60 | — | — | — |
| J | Trilobe | .180 | — | .000933 | .0695 | .0134 | .51 | .70 | .74 | 23.3 | 174 |
| K | 1/8" Cylinder | .201 | .115 | .00209 | .0934 | .0224 | .51 | .74 | .78 | 27.7 | 223 |

TABLE VI

GAS OIL TEST ACTIVITY RESULTS

| Catalyst I.D. | Description | % Sulfur Removal 650F | % Sulfur Removal 725F | % Relative Activities Volume 650F | % Relative Activities Volume 725F | % Relative Activities Weight 650F | % Relative Activities Weight 725F | $V_p/S_p$ in. | Concavity C |
|---|---|---|---|---|---|---|---|---|---|
| L | Dilobe | 66.2 | 97.8 | 117 | 112 | 120 | 115 | .0139 | 1.04 |
| M | Flat Plate | 85.3 | 96.9 | 110 | 78 | 104 | 74 | .0154 | 1.00 |

TABLE VII

PHYSICAL PROPERTIES

Figure 5:
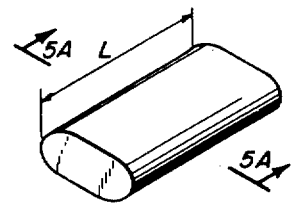
FIG. 5 is a "plate," a convex catalyst not contemplated by this invention, wherein the dimensions are L=0.186 inch, D=0.094 inch, and d=0.056 inch.
Figure 5A:
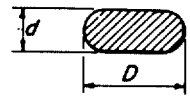

| I.D. | Description | Length (in.) | Dia. (in.) | $V_p$ (in)³ | $S_p$ (in)² | $V_p/S_p$ in. | PV cc/g | ABD g/cc | CBD g/cc | CS lbs. | CS/L lbs./in. |
|---|---|---|---|---|---|---|---|---|---|---|---|
| L | Dilobe (FIG. 6 Drawings) | .181 | — | .000756 | .0544 | .0139 | .55 | .64 | .71 | 52 | 415 |
| M | Flat Plate (FIG. 5 Drawings) | .187 | — | .000874 | .0567 | .0154 | .56 | .68 | .72 | 57 | 455 |

EXAMPLES L-M

Using the same catalyst material as was used in Examples A-G and the same test, these catalysts were rotary calcined as were the Series II catalysts in Table I hereinbefore.

Figure 4:
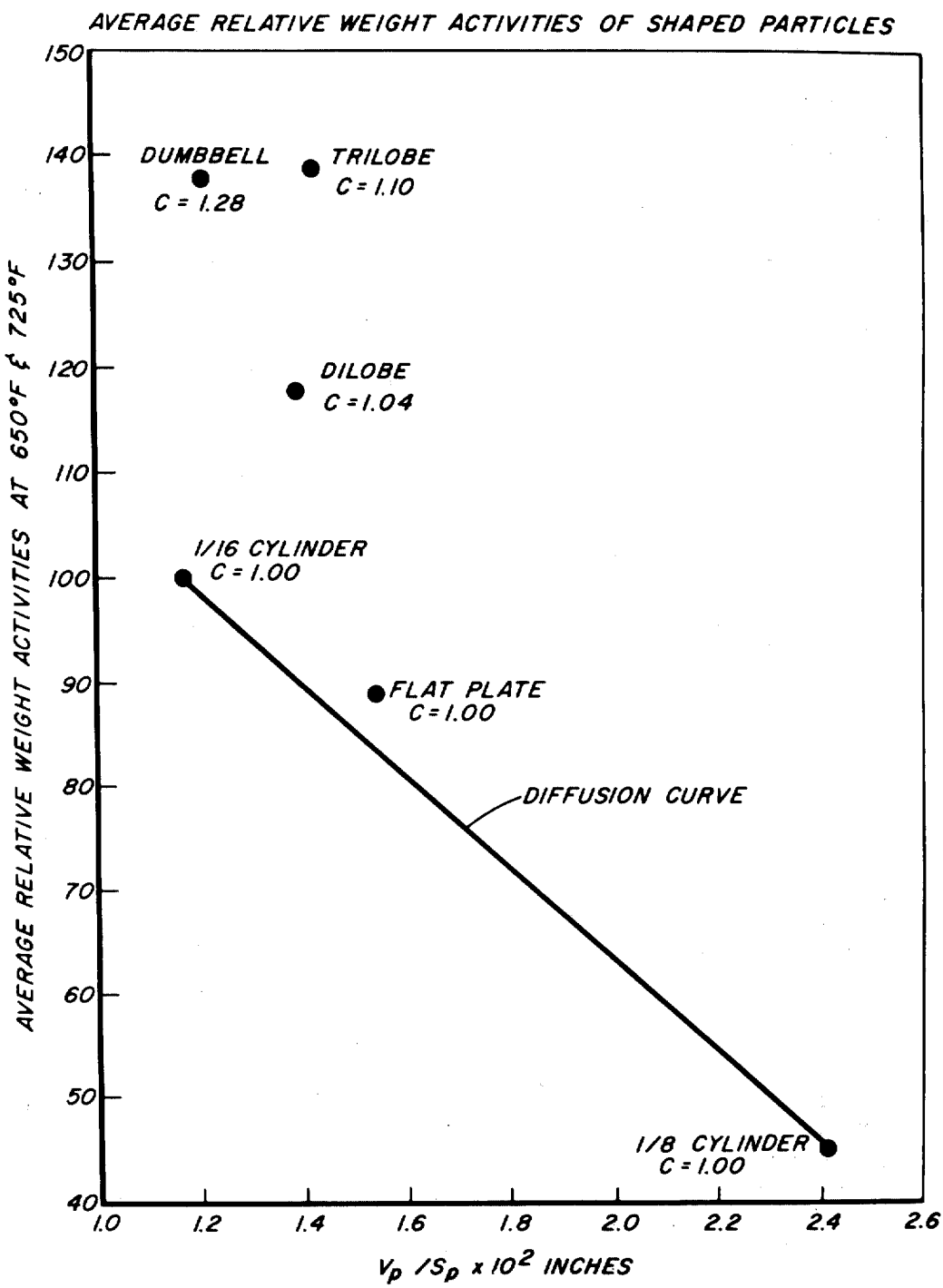
FIG. 4 is a graph comparing the Average Relative Weight Activities of catalyst particles of the present invention with conventional catalyst particles of like composition.

The shapes studied were a dilobe with a small amount of concavity, C=1.04, and a flat plate which is convex, C=1.00, but with a noncircular cross section. These results are shown in Table VI. The average results from catalyst A and catalyst C were used to calculate the relative activities in Table VI. To simplify the data interpretation the average relative weight activities (650° F, and 725° F.) are plotted as a function of particle size in FIG. 4. In general those particles with a concavity index, C, equal to 1.00 fall on the diffusion curve. The dilobe with C=1.04 falls above the diffusion curve but not as high as those with C=1.10 or greater. These data tend to support the hypothesis that C must be greater than 1.00. FIG. 4 demonstrates that. Preferably, C should be in the neighborhood of 1.10.

It will be apparent that the above described invention and parameters relate to freshly prepared catalyst particles of unique size and shape and does not contemplate conventional catalyst shapes and size having imperfection therein of the type that may be described as knicks, chips, abrasions, bends and the like.

In Examples A-M, inclusive, the advantages in activity in processing gas oils is apparent for catalysts of unique shape. In hydrotreating gas oils, however, a wide range of average pore diameter in the catalyst material may be used effectively, i.e., the activity values appear to be influenced by the shape factor apart from any influence resulting from average pore diameter. This is apparently due to the fact that the gas oils have a relatively low boiling range, reflecting low molecular weight of components, and are essentially free from metallic components.

In the numerical examples which follow, hydrotreating is effected on petroleum residuums, which contain metallic contaminants and have a higher boiling range than gas oils, reflecting relatively higher molecular weight components than in gas oil. These properties of the feedstock processed have been held to influence the specific average pore diameter of catalysts that can effectively be employed. Therefore, in the numerical examples the average pore diameter values are given.

EXAMPLE 1

An alumina was precipitated over a heel of silica hydrogel. The resulting precipitate was washed free of salts. Ammonium heptamolbdate [$(NH_4)_6MO_7O_{24}$] and water were added to the washed aqueous slurry and the mixture was spray dried.

To (1 part) of the spray dried powder was added 1 part of water and 0.33 part of concentrated $HNO_3$. The ingredients were mixed together and then extruded using a die containing orifices in the trilobe shape. The extrudates were dried at 120° C. for 16 hours and then calcined at 650° C for 1 hour.

An 800 gram portion of the calcined extrudates was impregnated with an aqueous solution at 136 grams $Co(NO_3)_2 \cdot 6H_2O$ and 53 grams urea. The impregnated extrudates were dried at 120° C. for 16 hours and then calcined at 650° C. for 1 hour.

Extrudate properties are given in Table VIII, porosity in FIG. 12, and activity in FIG. 13.

EXAMPLE 2

The procedure of Example 1 was followed in every material detail except that drying and calcining of the extrudate was carried out in the presence of a positive air flow by placing a vacuum line beneath the catalyst particles

TABLE VIII

| SHAPED EXTRUDATE PROPERTIES | | | |
|---|---|---|---|
| Property | Example 1 | Example 2 | Comparative Example I |
| Pore Volume ($H_2O$) ml. | 0.49 | 0.47 | 0.76 |
| Pore Volume (Hg)* ml. | 0.45 | 0.41 | 0.75 |
| Surface Area ($N_2$) m²/gm | 237 | — | 211 |
| Surface Area (Hg)* m²/gm | 243 | 254 | 195 |
| Mean Pore Diameter (Hg)* Å | 68 | 54 | 146 |
| Compacted Bulk Density g./l | .76 | .80 | .55 |
| Particle Length (inch) | 0.114 | 0.135 | 0.12 |
| Maximum Diameter (D) (inch) | 0.51 | 0.51 | 0.53 |
| Composition Weight Percent | | | |
| CoO | 4 | 4 | 4 |
| $MoO_3$ | 12 | 12 | 12 |
| $SiO_2$ | 2 | 2 | 2 |
| $Al_2O_3$ | Balance | Balance | Balance |

*140° Contact Angle placed in a rack. The air flow was employed in the drying and calcining steps prior to and subsequent to impregnation.

Extrudate properties are also given in Table VIII and FIGS. 12 and 13.

Comparative Example I

A spray dried precipitated alumina was prepared according to conventional procedures. To 1 part of the alumina was added 0.25 part of silica hydrogel of 7.2% calcined solids, 0.14 part of $Co(NO_3)_2 \cdot 6H_2O$, 0.13 parts of $(NH_4)_6Mo_7O_{24} \cdot XH_2O$, 0.05 part urea, 0.7 part water, 0.075 part ammonia hydroxide (28% $NH_3$), and 0.009 part of Superfloc (a high molecular weight polyacrylamide). The components were mixed together and extruded as trilobe extrudates. The extrudates were dried at 120° C. for 16 hours and calcined at 650° C. for 1 hour.

Extrudate properties are also given in Table VIII and FIGS. 12 and 13.

In Table VIII, it can be seen that the major differences in catalysts of the present invention and that of the prior art (Comparative Example I) are the total pore volume, mean pore diameter, and compacted bulk density, the latter property being influenced by total pore volume.

In FIG. 12, the specific distribution of pore diameters in the catalyst materials can be seen and it can be readily appreciated that the majority of pores of catalysts of the present invention are within a narrow range of diameters in the range of 40–90 A units as measured.

In order to evaluate the catalysts for activity over an extended time period, the following test procedure was employed.

A suitable reactor was employed which contains two fixed beds in series each of a volume of 100 millimeters. In the case of the catalysts of Example 1 and Comparative Example I, the beds were each filled with 50 milliliters of catalyst and 50 milliliters of glass beads intimately mixed. In the case of the catalyst of Example 2, the beds were each filled with 100 milliliters of catalyst alone.

The catalysts were pretreated in a nitrogen atmosphere at 600° F. and then contacted with a gaseous mixture of 90 mole percent $H_2$ and 10 mole percent $H_2S$ at 600°–700° F. for 2 hours at an absolute pressure of 50 pounds per square inch.

In the hydrotreating reaction, a residuum feedstock of the following properties were employed:

| Kuwait Atmos. Resid. | |
|---|---|
| Gravity ° API | 22.4 |
| Sulfur Weight Percent | 3.6 |
| Metal Parts Per Million | |
| V | 45 |
| Ni | 12 |
| Na | 10 |
| Basic N | 289. |

Hydrogen gas and the resid were mixed together and fed into the top of the reactor. The conditions maintained during reaction were as follows:

| | |
|---|---|
| Temperature | 725° F. |
| Liquid Hourly Spaced Velocity | 0.5 reciprocal hr. |
| $H_2$ addition rate | 1000 SCF/barrel Oil |
| Total Pressure | 800 pounds/inch² gauge |

After various time intervals of reaction, the percent sulfur removal was determined and the data plotted as a function of time of operation. In the case of Example 1, duplicate runs were made. The results are shown in FIG. 13.

From FIG. 13, it can be readily seen that sulfur removal is greater for a catalyst of the present invention than for the prior art catalyst. It can also be seen that as the time of use for a catalyst increases, the prior art catalysts shows a much greater loss in activity than does a catalyst of the present invention.

EXAMPLE 3

In order to illustrate the unexpected crush strength properties of catalyst particles of the present invention, the crush strength values of individual particles were divided by the ratio of geometric volume to geometric surface of the individual particles, this ratio indicating the actual particle size. Thus, the result of such division indicates the strength of the particle as a function of its particle size. The results are given in TABLE IX, which follows.

TABLE X

| Crush Strength vs. Particle Size | | | |
|---|---|---|---|
| Catalyst | Catalyst Shape | Vp/Sp Inch | Crush Strength (lbs.) | Crush Strength Vp/Sp (lbs.in.) |
| A | 1/16" cylinder | 0.0117 | 21.5 | 1840 |
| C | Trilobe | 0.0142 | 31.3 | 2210 |
| D | 1/8" cylinder | 0.0241 | 29.0 | 1205 |
| H | 1/16" cylinder | 0.0112 | 12.3 | 1100 |
| J | Trilobe | 0.0134 | 23.3 | 1740 |
| K | 1/8" Cylinder | 0.0224 | 27.7 | 1235 |

The results in TABLE IX show that the trilobal shaped catalyst of the present invention has a greater crush strength than would be expected from its particle size. The differences in values associated with Catalysts, A, C and D and Catalysts H, J and K result from differences in calcination conditions in preparing the catalysts, but the higher particle strength of catalysts of the invention is evident under either condition of calcination.

It is to be noted that attrition or abrasion, resistance of catalyst particles is influenced by their crush strength, better resistance being generally obtained at higher crush strength values.

It is also to be noted that particle strength and particle integrity are not necessarily the same. In measuring particle strength, the particle is crushed to a powder. However, the specific cross-sectional shape of a particle may be ruptured well before the crushing force necessary to pulverize the particle is reached. Thus, when the cross-sectional shape is such as to contain extensive arms, such as in the clover-leaf shape of U.S. Pat. No. 3,674,680, the arms are ruptured at crush strength values well below that necessary to pulverize the particle. Catalysts of the present invention, however, have particle integrity that is substantially equivalent to particle strength.

I claim:

1. A process for hydrotreating a petroleum residuum with a porous hydrotreating catalyst particle to obtain a desulfurized product, said particle having a composition of a major portion of alumina; up to about 36 weight percent of silica, based on the total weight of silica and alumina; from about 10 to 25 weight percent of molybdenum in the form of its oxide or sulfide; and a total of about 1 to 8 weight percent of a metal selected from cobalt, nickel, and mixtures thereof in the form of the corresponding oxide or sulfide, said percentages being based on the total weight of said catalyst particle; said particle being further characterized by a polylobal cross-sectional shape defining a concave geometric solid, said cross-sectional shape being defined by circles, all of said circles being spaced from one another by a distance which is from three-eighths to about fifteen-sixteenths of the diameters of said circles and when more than two lobes are present, lines connecting the centers of adjacent circles form a substantially equilateral polygon, each side of said polygon being from three-eighths to fifteen-sixteenths of the diameter of said circles and all of said cross-sectional shape included by said circles being of said composition; said particle size being defined by a ratio of geometric volume to geometric surface in the range of about 0.001 to 0.042 inch; a catalytic surface area greater than 150 square meters per gram; and a catalytic pore volume in the range of about 0.35 to 0.85 cubic centimeters per gram, said pore volume resulting from a major portion of pores of diameter in the range of 40 to 90 Angstrom units when measured with mercury at up to about 50,000 pounds per square inch absolute pressure and a contact angle of 140°; which process comprises contacting said residuum with said catalyst particle and with hydrogen at a flow rate of about 500 to 5,000 standard cubic feed per barrel of oil at a liquid hourly space velocity of about 0.20 to 5.0 reciprocal hour, a temperature in the range of about 600° to 850° F., and a total pressure in the range of about 200 to 10,000 pounds per square inch guage.

2. The process of claim 1 wherein the hydrogen flow rate is 2,000 to 4,000 standard cubic feet per barrel of residuum.

3. The process of claim 1 wherein the liquid hourly space velocity is 0.2–0.8 reciprocal hour.

4. The process of claim 1 wherein the temperature is 650°–750° F.

5. The process of claim 1 wherein the total pressure is 600–2000 pounds per square inch gauge.

6. The process of claim 1 wherein the hydrogen flow rate is 1,000 standard cubic feet per barrel of oil the liquid hourly space velocity is 0.5 reciprocal hour, the temperature is 725° F., and the total pressure is 800 pounds per square inch gauge.

7. A process for hydrotreating a petroleum residuum with a porous hydrotreating catalyst particle to obtain a desulfurized product, said particle having a composition comprising a major portion of alumina; up to about 36 weight percent of silica, based on the total weight of silica and alumina; from about 10 to 25 weight percent of molybdenum in the form of its oxide or sulfide; and a total of about 1 to 8 weight percent of a metal selected from cobalt, nickel and mixtures thereof in the form of the corresponding oxide or sulfide, said percentages being based on the total weight of said catalyst particle, said particle being further characterized by a trilobal cross-sectional shape defining a concave geometric solid, said trilobal cross-sectional shape being defined by circles, all of said circles in said cross-sectional shape having equal diameters, the centers of said circles being spaced from one another by a distance which is from about three-eighths to fifteen-sixteenths of the diameters of said circles, lines connecting the centers of adjacent circles form a substantially equilateral triangle, each side of said triangle being from three-eighths to fifteen-sixteenths of the diameters of said circles and all of the cross-sectional shape included by said circles being of said composition; said particle size being defined by a ratio of geometric volume to geometric surface in the range of about 0.005 to 0.025 inch; a catalytic surface area greater than 200 square meters per gram; and a catalytic pore volume in the range of about 0.45 to 0.85 cubic centimeters per gram, said catalytic pore volume resulting from a major portion of pores of diameter of about 40 to 90 Angstrom units when measured with mercury at up to about 50,000 pounds per square inch absolute pressure and a contact angle of 140°; which process comprises contacting said residuum with said catalyst particle and with hydrogen at a flow rate of about 500 to 5,000 standard cubic feet per barrel of oil at a liquid hourly space velocity of about 0.20 to 5.0 reciprocal hour, at a temperature in the range of about 600° to 850° F., and a total pressure in the range of about 200 to 10,000 pounds per square inch gauge.

* * * * *